United States Patent [19]

Piersol et al.

[11] 4,443,262

[45] Apr. 17, 1984

[54] LOW DENSITY FIBROUS SHEET MATERIAL

[75] Inventors: Jay L. Piersol; Frank J. Koller, Jr., both of Lancaster, Pa.

[73] Assignee: Armstrong World Industries, Inc., Lancaster, Pa.

[21] Appl. No.: 429,332

[22] Filed: Sep. 30, 1982

[51] Int. Cl.$^3$ ............................ C08L 5/00; D02G 3/00
[52] U.S. Cl. ...................................... 106/209; 162/155; 162/157.1; 162/178; 428/375; 428/378
[58] Field of Search ................ 106/209; 162/152, 155, 162/157 R, 178; 428/375, 378

[56] References Cited

U.S. PATENT DOCUMENTS

| | | | |
|---|---|---|---|
| 3,062,701 | 11/1962 | Novak | 162/155 |
| 3,477,865 | 11/1969 | Armbrust et al. | 106/208 |
| 4,190,492 | 2/1980 | Eckert et al. | 162/178 |

FOREIGN PATENT DOCUMENTS 57-117700  7/1982  Japan .................................. 162/152

*Primary Examiner*—Theodore Morris

[57] ABSTRACT

Disclosed is a method of forming a low density fibrous composition that has utility as an insulation material. The method comprises first forming an aqueous mixture comprising fibers, an anionic detergent and a cationic guar gum derivative. Borax is then added to the mixture to thereby form a precipitate wherein the guar gum is deposited on the fibers. The precipitate is dried to form the low density fibrous composition.

7 Claims, No Drawings

LOW DENSITY FIBROUS SHEET MATERIAL

SUMMARY OF THE INVENTION

The present invention involves a low density fibrous composition that may be used as an insulating material.

The composition of the present invention is produced by forming an aqueous mixture comprising fibers, a cationic guar gum derivative, and an anionic detergent. The mixture is agitated to form a homogeneous suspension. Borax is then added to the mixture and a precipitate forms. Water is then drained from the mixture and the precipitate is thereafter dried to form the low density composition. If desired, the precipitate may be formed into sheets prior to the drying operation to thereby form a low density fibrous sheet material.

DETAILED DESCRIPTION OF THE INVENTION

According to this invention there is provided, via an aqueous slurry system, a low density fibrous material which, preferably, has a density no greater than 10 lbs/Ft$^3$ and which exhibits excellent insulation properties. The material is produced in a preferred embodiment by first forming an aqueous fibrous slurry, adding to the slurry a cationic guar gum derivative and an anionic detergent, and agitating the resulting mixture, which will have a consistency of from about 1.4 to about 2.0 wt % solids.

In forming the aqueous mixture, it is preferable to add the cationic guar gum derivative first to the aqueous fiber slurry so that the guar gum is fully dissolved in the aqueous slurry. It is preferred that the anionic detergent be added after the guam gum is dissolved.

Borax is then added to the mixture and a precipitate, which comprises the guar gum deposited on the fibers, will immediately form. Water is drained from the precipitate and it is then preferably formed into sheets and dried.

Any fibers which can be utilized in conventional beater saturation processes can be employed in the present invention. Generally, the independent practitioner of this invention will choose the fibers to use based on the projected end use of the product.

The fibers will preferably have nominal lengths within the range of from about 0.5 to about 13 mm, and most preferably from about 1 mm to about 7 mm, and nominal diameters within the range of from about 3 microns to about 16 microns, and most preferably from about 4 to about 8 microns.

Fibers longer than those specified above may, at the option of the individual practicioner of this invention, be also added to mixture after the addition of the borax. The addition of such fibers would tend to reinforce the low density material. In any case, in order to facilitate the homogeneous mixture of the fibers, no more than about 15 wt % of such reinforcing fibers, based on the weight of the fibers utilized in the aqueous slurry, can advantageously be added to the mixture. In order to maximize reinforcing effects, such fibers should be from about 66 mm to about 26 mm in length.

Examples of suitable fibers that may be added both before and after the addition of the borax include, for example, mineral wool, ceramic fibers, cellulose fibers, asbestos fibers and aromatic polyamide fibers. Such fibers may be used separately or in combination. Suitable ceramic fibers include Babcock and Wilcox's chopped ceramic fiber available under the trade designation "Kaowool," which is an alumina-silica ceramic fiber that has a melting point of 3200° F., a specific gravity of 2.56, a tensile strength of $1.9 \times 10^5$ lbs/in$^2$ and a modulus of $16.8 \times 10^6$ lbs/in$^2$.

The term aromatic polyamide fibers is used herein to signify a family of fibers which have been granted the generic name "aramid" by the Federal Trade Commission. Particularly suitable aromatic polyamide fibers include those available from E. I. duPont deNemours and Company under the trade designations "Kevlar," "Kevlar 29," and "Kevlar 29" and "Nomex." Kevlar 49 aromatic polyamide fiber has a tensile strength of 400,000 lb/in$^2$, a modulus of 18,000,000 lb/in$^2$ and a density of 1.44 g/cm$^3$. Kevlar 29 aromatic polyamide fiber has a tensile strength of 400,000 lb/in$^2$, a modulus of 8,500,000 lb/in$^2$ and a density of 1.44 g/cm$^3$. Nomex aromtic polyamide fiber has a density of 1.38 g/cm$^2$ and a tensile strength of 95,000 lb/in$^2$.

The process of this invention will preferably utilize from about 5 to about 30 parts by weight of a cationic guar gum derivative for every 100 weight parts of fiber in the original fibrous slurry. It is preferred that high charge density cationic guar gum derivatives be utilized in the present invention. One example of a suitable commercially available cationic guar gum derivative is Celanese Jaguar ® CP-13 Guar Gum.

The process of this invention will also preferably utilize from about 3 to 40 parts by weight of an anionic detergent for every 100 weight parts of guar gum in the original mixture. The above weight range is based on the undiluted weight of the detergent and will vary depending on the detergent used.

Any commercially available anionic-type detergent is generally suitable for use in the present invention. The term "detergent" as used herein also encompasses anionic-type soaps. An example of a suitable detergent is sodium dodecylbenzene sulfonate, which is available from Stephen Chemical Co. under the trade name Biosoft D-40. Other suitable detergents include Ultrawet 60L which is available from the Arco Chemical Company and is classified as a linear alkylate sulfonate organic salt, and Mearlcel 2336, is available from The Mearl Corporation and is a sodium dodecyl benzene sulfonate.

The term "borax" is used herein to indicate any substance which, when added to the aqueous mixture of the present invention, will be a source of a sufficient amount of borate ions which will complex with the cationic guar gum derivative. Examples of suitable commercially available substances include Boraxo (a trademark of the United States Borax and Chemical Corporation for sodium borate), anhydrous Boraxo, sodium biboratedecahydrate and sodium biboratepentahydrate.

The process may also utilize, and the composition of the invention may thus contain, standard inorganic fillers which may be added to the aqueous fiber slurry prior to the addition of the borax. Examples of the inorganic filler(s) which may be added to the aqueous fiber slurry include paper filler clay, cork, wollastonite, talc, calcium carbonate, mica, and diatomaceous earth and perlite. Particularly suitable fillers include wollastonite of P-4, P-1 or C-1 grade, all commercially available from Interpace Company, kaolin paper filler clays designated "Hi-Opaque clay", commercially available from Freeport Kaolin Clay Company, "Narvon" paper filler clay, commercially available from Combustion Engineering Inc., and "Klondyke" paper filler clay or "Klondyke KWW" paper filler clay, both commercially available from Engelhart Minerals and Chemicals Corporation.

The amount of filler(s) added will be dependent on the amounts of fibers employed and on the needs of the individual practitioners of the invention.

The water utilized in the aqueous fiber slurry should be above 100° F., and preferably from about 100° F. to about 120° F. Such temperatures serve to improve the drainage rate and thus facilitate the dewatering process.

The process of the present invention can be carried out on a large scale on a variety of equipment such as, for example, standard papermaking machines which include a fourdrinier former, vacuum boxes and a flat bed dryer.

The following examples demonstrate the preparation of low density, fibrous sheet materials of this invention.

EXAMPLE I

Ingredients 200 g mineral wool
20 g Celanese CP-13 Guar Gum
20 cc D-40 Biosoft
130 cc saturated Borax 5M The mineral wool was added to a mixing vessel containing about 12 liters of heated tap water (100° F.). The contents of the mixing vessel were slurried for about 2 minutes to assure full dispersion of the ingredients at 1.67 consistency. Next, the total amount of guar gum was added with stirring for about 3 minutes. The Biosoft was then added to the mixture for 1 minute with very gentle agitation to thoroughly disperse the detergent in the mixture. The total amount of Borax was then added with stirring for 2 minutes until a precipitate formed.

The water was drained from the precipitate and the resulting composition was formed into a 1" thick hand sheet using a convention Williams hand sheet mold, and then air oven dried at 300° F. to substantially remove all moisture and to thereby form a homogeneous 1" thick sheet having a density of 6 lbs/ft.$^3$ and a moisture content of approximately 0.5%.

EXAMPLE II

The process of Example I was substantially repeated using the following formulation to form a sheet having a density of 7 lbs/ft.$^3$ and a moisture content of approximately 0.5%.

Ingredients 200 g mineral wool
40 g Celanese CP-13 Guar Gum
40 cc Biosoft D-40
120 cc saturated Borax 5M

What is claimed is:

1. A method of forming a low density fibrous composition, which method comprises (1) forming an aqueous mixture comprising fibers, an anionic detergent and a cationic guar gum derivative, (2) adding borax to the mixture to thereby form a precipitate in which the guar gum derivative is deposited on the fibers, and (3) drying the precipitate to thereby form the low density fibrous composition.

2. The method of claim 1 wherein the fibers are mineral wool.

3. The method of claim 1 wherein the aqueous mixture additionally contains at least one inorganic filler.

4. The method of claim 1 wherein, prior to its being dried, the precipitate is formed into sheets.

5. A low density fibrous composition comprising fibers, and, in parts by weight per 100 parts of fiber weight, 5 to 30 parts of a cationic guar gum derivative, said guar gum derivative serving as a binder for the fibers.

6. The composition of claim 5 wherein the fibers are mineral wool.

7. The composition of claim 5 which additionally contains at least one inorganic filler.

* * * * *